United States Patent
Zuraski, Jr.

(10) Patent No.: US 6,804,799 B2
(45) Date of Patent: Oct. 12, 2004

(54) USING TYPE BITS TO TRACK STORAGE OF ECC AND PREDECODE BITS IN A LEVEL TWO CACHE

(75) Inventor: Gerald D. Zuraski, Jr., Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 675 days.

(21) Appl. No.: 09/892,328

(22) Filed: Jun. 26, 2001

(65) Prior Publication Data

US 2002/0199151 A1 Dec. 26, 2002

(51) Int. Cl.$^7$ ................................................. G06F 11/10
(52) U.S. Cl. ........................... 714/54; 711/123; 714/805
(58) Field of Search .................... 711/123; 714/805, 714/54

(56) References Cited

U.S. PATENT DOCUMENTS

| | | | | |
|---|---|---|---|---|
| 4,747,043 A | | 5/1988 | Rodman ..................... | 364/200 |
| 4,942,519 A | | 7/1990 | Nakayama .................. | 364/200 |
| 5,214,769 A | | 5/1993 | Uchida et al. .............. | 395/425 |
| 5,265,004 A | | 11/1993 | Schultz et al. ............. | 364/140 |
| 5,604,753 A | * | 2/1997 | Bauer et al. ................ | 714/763 |
| 5,689,672 A | | 11/1997 | Witt et al. .................. | 395/329 |
| 5,721,854 A | | 2/1998 | Ebcioglu et al. ........... | 395/379 |
| 5,748,978 A | | 5/1998 | Narayan et al. ....... | 395/800.23 |
| 5,751,981 A | | 5/1998 | Witt et al. .................. | 395/380 |
| 5,752,264 A | | 5/1998 | Blake et al. ................ | 711/144 |
| 5,819,067 A | | 10/1998 | Lynch ........................ | 395/500 |
| 5,828,895 A | | 10/1998 | Chan et al. ........... | 395/800.23 |
| 5,951,671 A | | 9/1999 | Green ......................... | 712/23 |
| 6,092,182 A | | 7/2000 | Mahalingaiah ............. | 712/213 |
| 6,108,753 A | * | 8/2000 | Bossen et al. .............. | 711/118 |
| 6,115,795 A | * | 9/2000 | Gilda et al. ................. | 711/141 |
| 6,161,208 A | * | 12/2000 | Dutton et al. .............. | 714/764 |

OTHER PUBLICATIONS

Advanced Micro Devices, Inc., *AMD Athlon™ Processor and AMD Duron™ Processor with Full–Speed On–Die L2 Cache: Enabling and Innovative Cache Architecture for Personal Computing*, Jun. 19, 2000.
The PC Guide website, *Non–Parity, Parity and ECC Memory*, Site Version 2.2.0—Version Date: Apr. 17, 2001; http://www.pcguide.com/ref/ram/errParity-c.html.
Robert Morelos–Zaragoza. *The Error Correcting Codes (EEC) p.*, 1996–9.
Minagawa et al., *Pre–decoding Mechanism for Superscalar Architecture*, IEEE Pacific Rim Conference on Communications, Computers and Signal Processing, May 9–10, 1991.
International Search Report for PCT0US02/12768, mailed Aug. 14, 2002.

* cited by examiner

Primary Examiner—Stephen M. Baker
(74) Attorney, Agent, or Firm—Meyertons Hood Kivlin Kowert & Goetzel, P.C.; B. Noël Kivlin

(57) ABSTRACT

A microprocessor configured to store victimized instruction and data bytes is disclosed. In one embodiment, the microprocessor includes a predecode unit, and instruction cache, a data cache, and a level two cache. The predecode unit receives instruction bytes and generates corresponding predecode information that is stored in the instruction cache with the instruction bytes. The data cache receives and stores data bytes. The level two cache is configured to receive and store victimized instruction bytes from the instruction cache along with parity information and predecode information, and victimized data bytes from the data cache along with error correction code bits. Indicator bits may be stored on a cache line basis to indicate the type of data is stored therein.

23 Claims, 12 Drawing Sheets

USING TYPE BITS TO TRACK STORAGE OF ECC AND PREDECODE BITS IN A LEVEL TWO CACHE

BACKGROUND OF THE INVENTION

1. Field of the Invention

This invention relates to microprocessors and, more particularly, to decoding variable-length instructions within a microprocessor.

2. Description of the Relevant Art

The number of software applications written for the x86 instruction set is quite large. As a result, despite the introduction of newer and more advanced instruction sets, microprocessor designers have continued to design microprocessors capable of executing the x86 instruction set.

The x86 instruction set is relatively complex and is characterized by a plurality of variable-length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes 102. For example, one of prefix bytes 102 may be used to change the address or operand size for an instruction, to override the default segment used in memory addressing, or to instruct the processor to repeat a string operation a number of times. The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions makes decoding instructions difficult. Decoding instructions typically involves determining the boundaries of an instruction and then identifying each field within the instruction, e.g., the opcode and operand fields. Decoding typically takes place when the instruction is fetched from the instruction cache prior to execution.

One method for determining the boundaries of instructions involves generating and storing one or more predecode bits for each instruction byte as it is read from main memory and stored into the instruction cache. The predecode bits provide information about the instruction byte they are associated with. For example, an asserted predecode start bit indicates that the associated instruction byte is the first byte of an instruction. Once a start bit for a particular instruction byte is calculated, it is stored together with the instruction byte in the instruction cache. When a "fetch" is performed, a number of instruction bytes are read from the instruction cache and decoded in preparation for execution. Any associated start bits are scanned to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted. Once the valid mask has been calculated, it may be used to mask off bytes from other instructions.

Turning now to FIG. 2, an exemplary valid mask is shown. The figure illustrates a portion of a fetch 120 and its associated start bits 122. Assuming a valid mask 126 for instruction B 128 is to be generated, start bit 122A, and all bits between start bit 122A and start bit 122B are asserted to generate mask 126. Once generated, valid mask 126 may then be used to mask off all bytes within fetch 120 that are not part of instruction B 128.

As the description above indicates, predecode information may be particularly useful in reducing decode times. By storing the predecode information along with the instruction bytes in the instruction cache, the predecode information need only be calculated once, even if the corresponding instruction is executed a number of time (e.g., in a loop). Unfortunately, however, when the instruction is replaced or discarded from the instruction cache, any associated predecode information is lost. The next time the instruction is read into the instruction cache, predecode information must once again be generated. The time delay caused by waiting for the predecode information to be calculated may be particularly damaging to performance when the instruction is read into the instruction cache as the result of a branch misprediction or a cache miss. In contrast to instructions that are speculatively prefetched before they are needed, fetches resulting from branch mispredictions or cache misses may cause the microprocessor's decoders and functional units to stall while waiting to receive the requested instructions. In this case, the time required to produce the predecode information may have a significant impact upon the performance of the microprocessor.

For these and other reasons, a method and apparatus for reducing predecode times is desired. In particular, a method and apparatus for decreasing the time required to generate predecode information for instructions that have previously been discarded from an instruction cache is desired.

In U.S. Pat. No. 6,092,182, entitled "Using ECC/Parity Bits to Store Predecode Information," by Rupaka Mahalingaiah, one possible solution to these problems was proposed, namely storing predecode information in the ECC/parity bits of a level two cache. Advantageously, the delay of predecoding victimized instruction bytes could be bypassed in some cases.

However, the proposed solution left the data stored in the level two cache unprotected from single and multiple bit errors. Given the higher operating frequencies of current microprocessors and the level of integration, storage errors in caches are a potential concern, particular in caches. Thus, a system and method capable of reducing the amount of predecode information that is discarded while still retaining the ability to at least detect some of the more common types of errors (e.g., single bit errors) is desired.

SUMMARY

The problems noted above may at least in part be solved by a system and method for storing victimized instruction predecode information as described herein. In one embodiment, a microprocessor configured to store victimized instruction predecode information may include a predecode unit and a load/store unit. The predecode unit may be configured to receive instruction bytes and generate corresponding predecode information. The predecode unit may also be configured to store the instruction bytes and the corresponding predecode information in an instruction cache. The load/store unit may be configured to receive data bytes and store the data bytes in a data cache. The instruction cache and data cache may together form a "level one" cache for the processor. The processor may also include a level two cache that is configured to receive and store victimized instruction bytes and data bytes from the instruction cache and data cache, respectively. The level two cache may also be configured to receive and store parity information and predecode information for the stored victimized instruction bytes, and error correction code (ECC) bits for the stored victimized data bytes.

In one embodiment, the microprocessor may also include parity generation and checking logic that is configured to generate the parity bits for the instruction bytes stored in the level two cache. The parity generation and checking logic may also be configured to check the parity bits for the instruction bytes read from the level two cache. In some embodiments, the instruction cache may also be configured to store the parity information, thus allowing parity checking for the instruction bytes in both the instruction cache and the level two cache.

Similarly, the microprocessor may also include error checking and correction logic configured to generate error checking and correction code bits for the data bytes stored in the level two cache. The error checking and correction logic may be configured to check the ECC bits for the data bytes read from the level two cache. In some embodiments, the error checking and correction logic may be configured to correct at least one bit errors in the data bytes read from the data cache but level two cache.

In some embodiments, the level two cache may be divided into cache lines (e.g., logical rows and/or columns), wherein each cache line is configured to store victimized data or victimized instruction bytes. An indicator bit (also referred to as a "data type" bit) may be used in each cache line of the level two cache to indicate whether (a) victimized instruction bytes, predecode information, and parity information, or (b) ECC information and data bytes, are stored therein. In some embodiments, the level two cache may be exclusive in that it stores only victimized instruction and data bytes and their corresponding ECC bits, parity bits, predecode bits, and indicator bits. In other embodiments, the level two cache may be inclusive in that it also stores copies of instruction bytes and data bytes that have not yet been victimized.

A system for storing victimized predecode information is also contemplated. In one embodiment, the system may include a processor configured to receive instruction and data bytes. The processor may be configured to operate on the data bytes according to instructions formed by the instruction bytes. The system may also include a cache that is configured to receive and store victimized instruction bytes and victimized data bytes from the processor. The cache may be configured to receive and store parity information and predecode information for the victimized instruction bytes. The cache may also be configured to receive and store ECC bits for the stored victimized data bytes. The cache may be configured to provide the victimized data bytes and corresponding ECC bits to the processor in response to the processor requesting the victimized data bytes. Similarly, the cache may be configured to provide the stored victimized instruction bytes and corresponding parity and predecode information to the processor in response to the processor requesting the victimized instruction bytes. Advantageously, the processor may use the predecode information from the instruction cache in lieu of regenerating new predecode information for the instruction bytes. In the event of a write to the instruction bytes (e.g., self-modifying code), the stored predecode information may be invalidated (e.g., by storing an invalidation constant over the predecode information), and new parity information may be calculated.

In some embodiments, the cache may be implemented as a level two cache that is formed on a common die with the processor. In other embodiments, the cache may be formed on a different die from the processor. In some embodiments, the cache may be divided into a first section configured to store victimized instruction bytes (and corresponding predecode and parity information), and a second section configured to store victimized data bytes and corresponding ECC information.

A method for storing victimized predecode information is also contemplated. In one embodiment, the method may include receiving instruction bytes and generating corresponding predecode information therefor. The instruction bytes and predecode information may then be stored in a first memory. At least a portion of the instruction bytes and the predecode information may be output to a second memory in response to the instruction bytes being overwritten in the first memory. At least one parity bit corresponding to the instructions bytes and predecode information stored into the second memory may be generated and stored in the second memory. The method may also include receiving data bytes and storing the data bytes to a third memory. At least a portion of the data bytes may be stored to the second memory in response to the data bytes being overwritten in the third memory. The data bytes may have ECC information generated and stored with them in the second memory. Indicator bits for each cache line in the second memory may also be generated and stored therein to indicate whether instruction bytes with predecode bits and parity information or data bytes with ECC information are stored therein.

BRIEF DESCRIPTION OF THE DRAWINGS

Other objects and advantages of the invention will become apparent upon reading the following detailed description and upon reference to the accompanying drawings in which.

Figure 1:
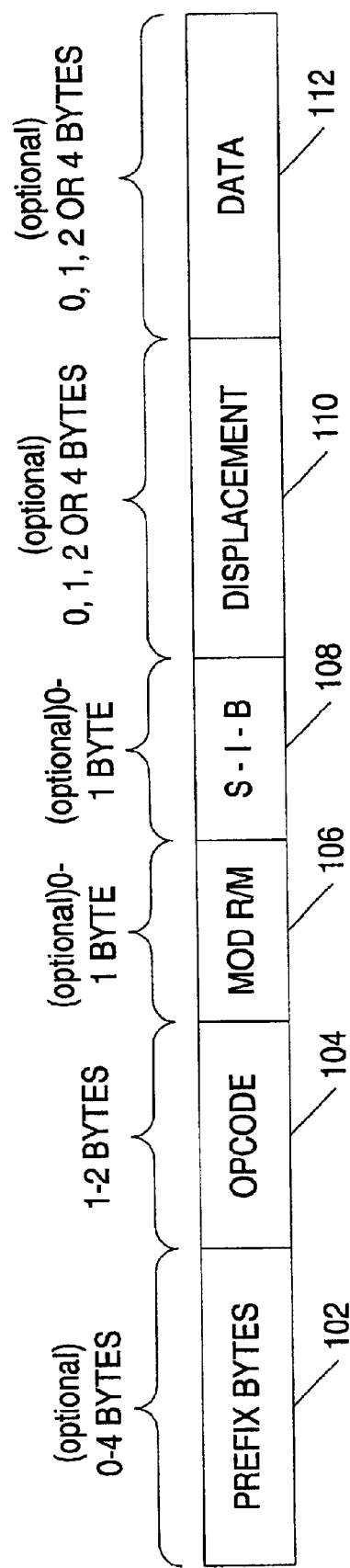
FIG. 1 is a block diagram of a generic x86 instruction format.
Figure 2:
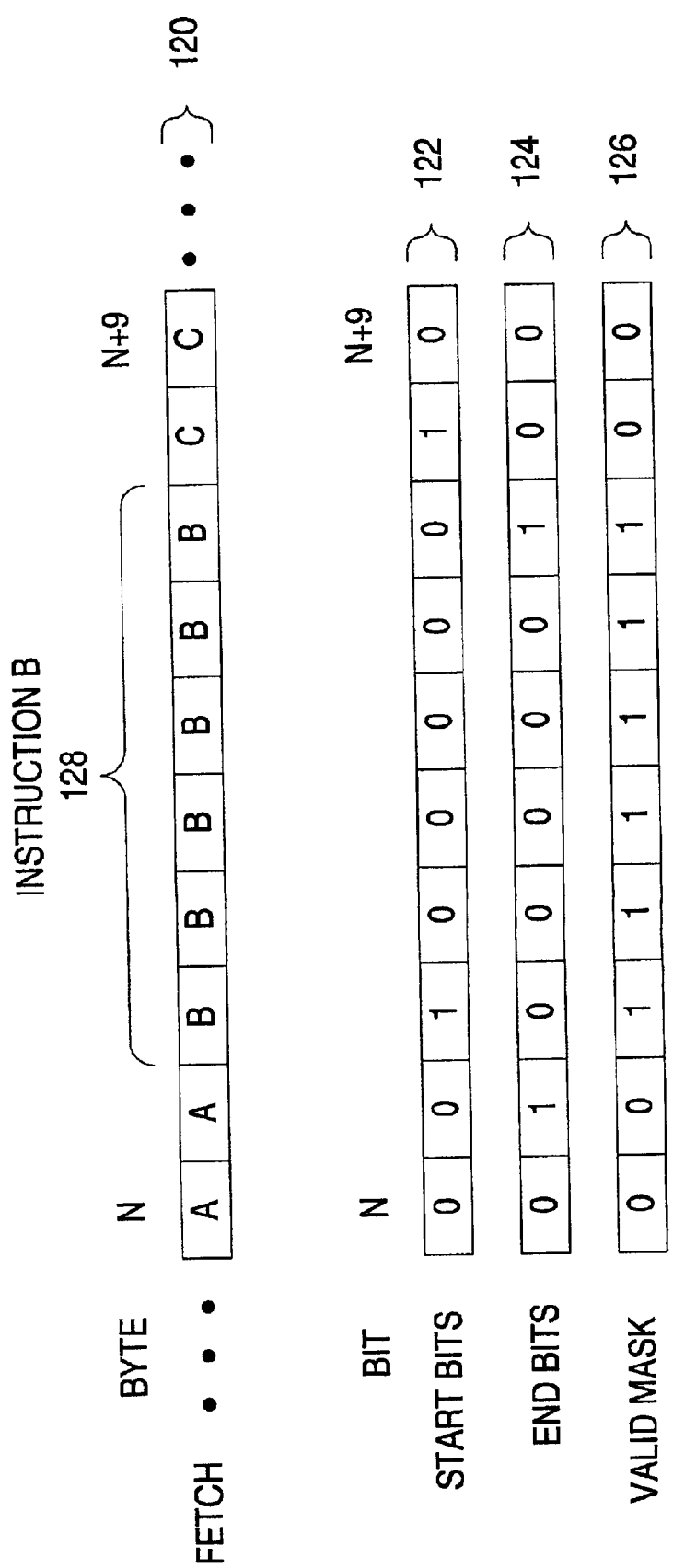
FIG. 2 is a block diagram illustrating one embodiment of a valid mask.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF AN EMBODIMENT

Figure 3:
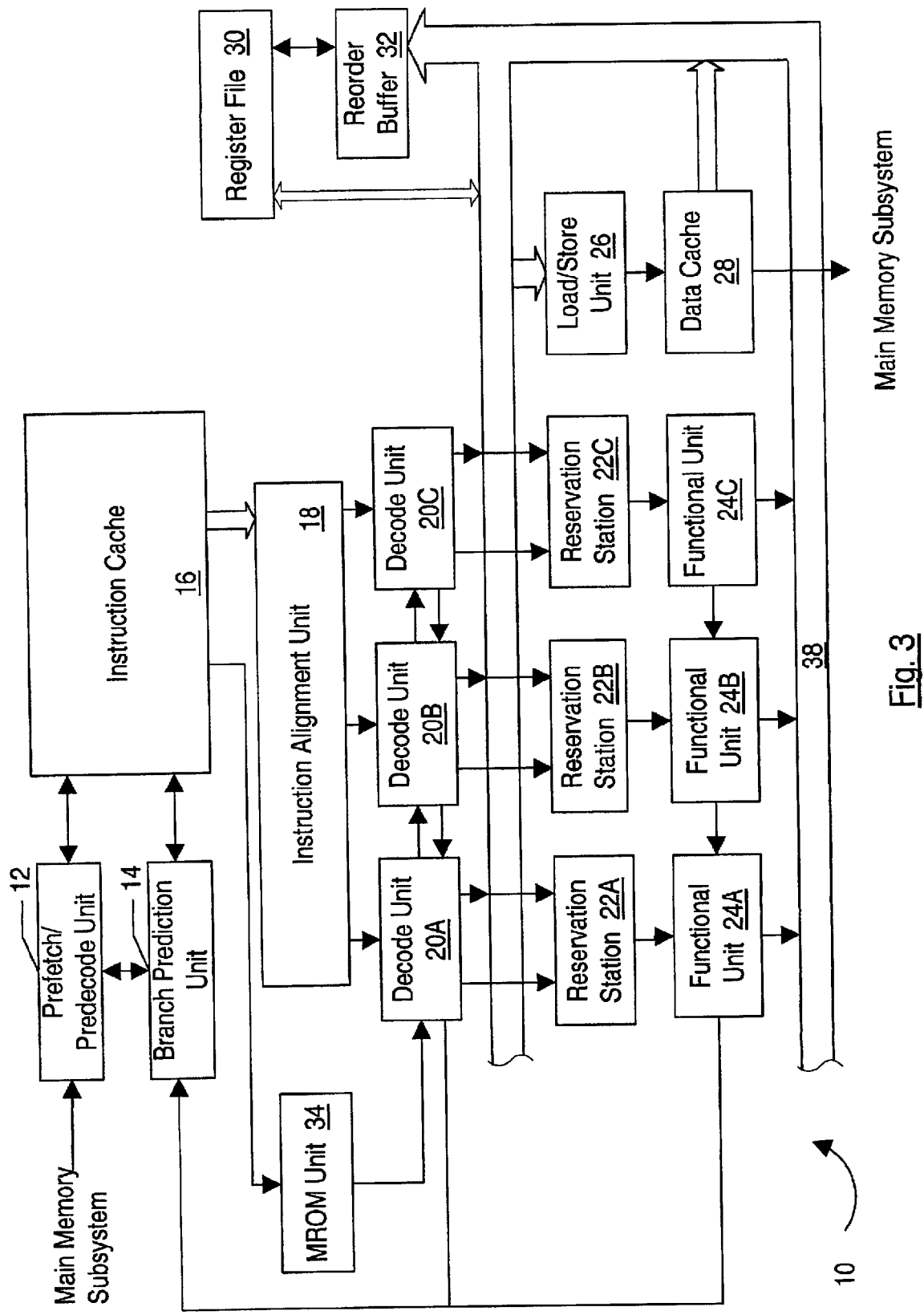
FIG. 3 is a block diagram of one embodiment of a microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and MROM unit 34. Elements referred to herein with a particular reference number followed by a letter may be collectively referred to by the reference number alone. For example, reservation stations 22A–22C may be collectively referred to as reservation stations 22.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Branch prediction unit 14 is also coupled to instruction alignment unit 18 and functional units 24A–C. Instruction cache 16 is further coupled to MROM unit 34 and instruction alignment unit 18. Instruction alignment unit 18 is in turn coupled to load/store unit 26 and to respective decode units 20A–C. Respective decode units 20A–C are coupled to reservation stations 22A–C, which are further coupled to respective functional units 24A–C. Additionally, instruction alignment unit 18 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to instruction alignment unit 18.

Instructions are prefetched from main memory by prefetch/predecode unit 12. Prefetch/predecode unit 12 predecodes the variable-length instructions to fixed length instructions which are then stored in instruction cache 16. Instructions may be prefetched and predecoded before they are actually requested by using a prefetch scheme. A variety of prefetch schemes may be employed by prefetch/predecode unit 12. Before proceeding with a more detailed description of predecode unit 12 and instruction cache 16, general aspects regarding the embodiment of exemplary microprocessor 10 shown in the figure will be described.

Microprocessor 10 may employ branch prediction in order to speculatively fetch instructions subsequent to conditional branch instructions. Branch prediction unit 14 is included to perform branch prediction operations. In one embodiment, up to two branch target addresses are stored for each 16-byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched to branch prediction unit 14. This allows branch prediction unit 14 to determine which branch target addresses to select when forming a branch prediction. Instruction alignment unit 18 and functional units 24 provide update information to branch prediction unit 14. Because branch prediction unit 14 stores two targets per 16-byte portion of the cache line, predictions for some branch instructions within the line may not be stored in branch prediction unit 14.

Instruction alignment unit 18 may be configured to detect branch instructions which were not predicted by branch prediction unit 14. Functional units 24 execute the branch instructions and determine if the predicted branch direction was mispredicted. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instruction cache 16 is a high speed cache memory provided to store instructions received from prefetch/predecode unit 12. Stored instructions are then fetched from instruction cache 16 and forwarded to instruction alignment unit 18. In one embodiment, instruction cache 16 may be configured as a set-associative structure. Instruction cache 16 may additionally employ a way prediction scheme in order to speed access times. For example, instead of accessing tags identifying each line of instructions and comparing the tags to the fetch address to select a way, instruction cache 16 may predict the way that is accessed. In this manner, the way is speculatively selected prior to accessing the array. Using way prediction, the access time of instruction cache 16 may be similar to a direct-mapped cache. After the instruction bytes have been read, a tag comparison is performed for verification. If the way prediction is incorrect, the correct instruction bytes are fetched and the incorrect instruction bytes (which are further down the processing pipeline) are discarded. It is noted that instruction cache 16 may be implemented in fully associative, set associative, or direct mapped configurations.

MROM unit 34 is a read-only memory that is configured to store sequences of "fast-path instructions." Fast path instructions are instructions that may be decoded and executed by decoders 20A–C and functional units 24A–C. In contrast, "MROM instructions" are instructions which are too complex for direct decoding or execution by decoders 20A–C and functional units 24A–C. When instruction cache 16 outputs an MROM instruction, MROM unit 34 responds by outputting a sequence of fast path instructions. More specifically, MROM unit 34 parses and translates the MROM instruction into a subset of defined fast path instructions to effectuate the desired operation. MROM unit 34 dispatches the subset of fast path instructions to decode units 20A–C.

Once instruction bytes are fetched from instruction cache 16, they are conveyed to instruction alignment unit 18. Instruction alignment unit 18 routes the instructions to one of decode unit 20A–C. Register operand information is also detected and routed to register file 30 and reorder buffer 32. Additionally, if the instructions require one or more memory operations to be performed, instruction alignment unit 18 dispatches the memory operations to load/store unit 26. Each decoded instruction is dispatched to reservation stations 22 along with operand address information and displacement or immediate data which may be included with the instruction.

Microprocessor 10 supports out-of-order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register. The temporary storage location stores the speculative register state that results from the speculative execution of an instruction. If a branch prediction is incorrect, the results from the speculatively-executed instructions along the mispredicted path can be invalidated in the reorder buffer 32 before they are written to register file 30. Similarly, if a particular instruction causes an exception, instructions subsequent to the exception-causing instruction may be discarded. In this manner, exceptions are "precise" (i.e., instructions subsequent to the exception-causing instruction are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The decoded instructions and immediate or displacement data provided at the outputs of instruction alignment unit 18 are routed directly to respective reservation stations 22. In one embodiment, each reservation station 22 is capable of holding instruction information (i.e., decoded instructions as well as operand values, operand tags and/or immediate data) for up to three pending instructions awaiting issue to the corresponding functional unit. It is noted that for the embodiment shown in the figure, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32-bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32-bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register.

If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions whenever one or more instructions are dispatched by instruction alignment unit 18. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each functional units 24A–C is configured to perform integer arithmetic operations of addition and subtraction, as well as shifts, rotates, logical operations, and branch operations. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes a fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. When the buffer is full, instruction alignment unit 18 waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations may be performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight-way set-associative structure. Similar to instruction cache 16, data cache 28 may employ a way prediction mechanism. It is understood that data cache 28 may be implemented in a variety of specific memory configurations, including set-associative and direct-mapped configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Prefetch/Predecode Unit and Instruction Cache Configuration

As previously noted, many memory devices designed for use as external caches for microprocessors, e.g., Intel's 82491/82492 cache SRAMs, may be configured to store parity information. In one embodiment, one parity bit may be stored for every eight data bits. Assuming even parity is desired, a data byte of $01101011_2$ would have an asserted parity bit so that the total number of asserted bits is even. The parity bit may be generated by the microprocessor and then stored in the external cache along with the data byte. When the microprocessor reads the data back from the cache, it may count the asserted data and parity bits. If the resulting value does not match the selected parity, then a parity error has occurred and the microprocessor may take appropriate action, e.g., signal the occurrence of a memory error to the operating system. Other memory device configurations may allocate additional bits for error checking and correction (ECC).

While high-end systems such as servers typically support parity and ECC, many low and mid-range system designers choose not activate these features because of the relatively low probability of a data error occurring. In these systems, the parity and ECC bits in level two caches may be used for storing predecode information. This may advantageously improve performance without requiring extensive hardware changes at the system level.

Figure 4:
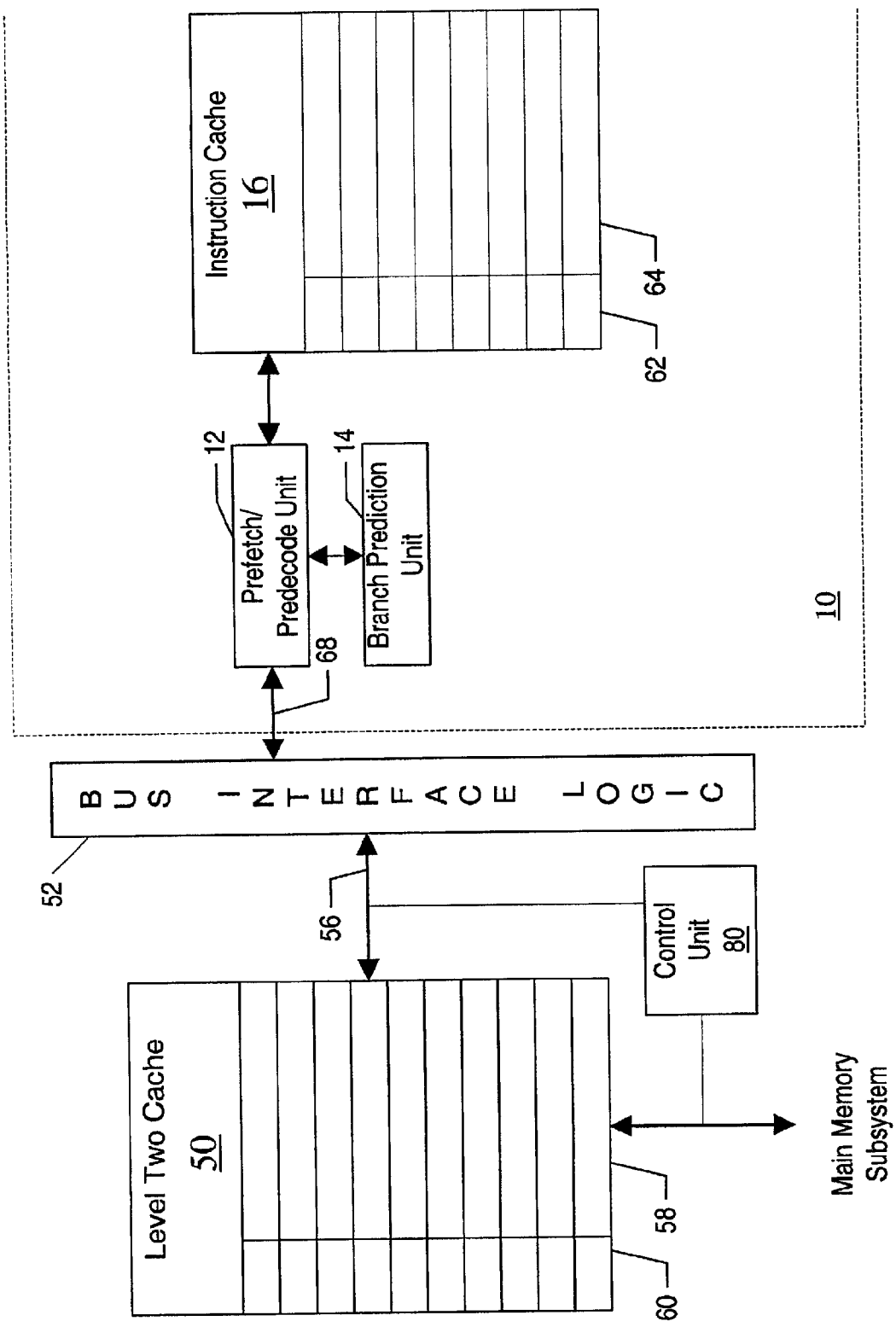
FIG. 4 is diagram illustrating details of one embodiment of the interface between the instruction cache of FIG. 3 and a level two cache.

Turning now to FIG. 4, a diagram illustrating details of one embodiment of predecode unit 12 and instruction cache 16 is shown. In this embodiment, predecode unit 12 is coupled to a cache 50 via bus interface logic 52. Cache 50 comprises a low-latency, high-bandwidth memory that resides either on the same silicon as microprocessor 10, or on separate silicon that is coupled nearby, e.g., on a daughtercard or on a motherboard close to microprocessor 10. Cache 50 may comprise static random access memories (SRAMs), synchronous dynamic access memories (SDRAMs), or other types of low latency memories. Cache 50 may reside on the same silicon as microprocessor 10 or separate silicon. In some embodiments, cache 50 may be referred to as a "level two" cache because it is the second closest cache to the functional units of microprocessor 10, i.e., behind level one instruction cache 16 and data cache 28. Cache 50 may also be referred to as an "external cache" because it is external to the microprocessor.

Bus interface logic 52 may comprise multiplexers, buffers, transceivers, drivers, or any other type of bus interface logic that may enable or improve the transmission of data, address, and control signals between microprocessor 10 and cache 50. In some embodiments, no bus interface logic 52 may be necessary between microprocessor 10 and level two cache 50. For example, if microprocessor 10 and level two cache 50 are physically close enough to one another and the drive capability of their output transistors is high enough, then microprocessor 10 and cache 50 may be coupled to each other without bus interface logic 52.

Predecode logic 12 is configured to receive instruction addresses to be prefetched from branch prediction unit 14 and convey them to cache 50 via bus 68, bus interface logic 52, and memory bus 56. If level two cache 50 is storing the instruction bytes corresponding to the requested address, a predetermined number of instruction bytes (e.g., one cache line of 32 bytes) are conveyed to predecode unit 12 via bus 56, bus interface logic 52 and bus 68. If the requested instruction bytes are not stored within level two cache 50, cache 50 is configured to retrieve the requested instruction bytes from the main memory subsystem. Once the requested instruction bytes are conveyed from the main memory subsystem, they are conveyed to instruction cache 16. They may also be stored in cache 50.

When predecode unit 12 receives the requested instruction bytes, it generates predecode information for each instruction byte. In the embodiment illustrated in the figure, predecode unit 12 generates one start bit for each instruction byte. Assuming predecode unit 12 receives 32 bytes (e.g., one cache line) in response to outputting a requested address, predecode unit 12 may be configured to generate one start bit for each instruction byte for a total of 32 start bits. Once generated, the start bits are conveyed to instruction cache 16, where they are stored together with their associated instruction bytes. Instruction cache 16 may be locally organized into a plurality of cache line storage locations 64 and a plurality of predecode information storage locations 62, wherein one predecode information storage location corresponds to each cache line storage location. The instruction bytes and predecode bits may also be routed directly to instruction alignment unit 18.

Once all cache line storage locations 62 within instruction cache 16 are full, a number of different algorithms may be used to decide which cache line should be replaced upon a cache miss. For example, to reduce the chance of throwing out information that will be needed in the near future, a least-recently used (LRU) replacement scheme that records the order of cache accesses may be used. When the cache line to be overwritten is selected, the associated predecode information stored in the corresponding predecode storage location 62 is output from instruction cache 16 to cache 50 by way of predecode unit 12 and bus interface logic 52. Predecode unit 12 also conveys the address corresponding to the instruction cache information being overwritten.

When cache 50 receives the predecode bits and the corresponding address from prefetch unit 12 and instruction cache 16, cache 50 is configured to store the predecode bits in the parity bit storage locations 60 associated with the corresponding address. In some embodiments, the actual instruction bytes to be overwritten in instruction cache 16 may also be output to cache 50 for storage along with the predecode bits. This configuration might be advantageous in some embodiments of microprocessor 10 for supporting self-modifying code. For example, store addresses may be "snooped" by instruction cache 16 to determine if a store instruction will overwrite instruction bytes stored within instruction cache 16. If so, the store instruction may be performed to instruction cache 16 and data cache 28, thereby modifying the desired instruction bytes. In such a configuration, predecode unit 12 may be configured to recalculate predecode information for the instruction that has been modified and then store the recalculated predecode bits into instruction cache 16. If cache 50 is configured as a write-back cache, the modified instruction bytes may later be written to cache 50 when the cache line storage location storing the modified instruction bytes is overwritten in instruction cache 16.

After the predecode information (and instruction bytes, if so configured) are written to cache 50, the cache line storage location and predecode information storage location within instruction cache 16 may be safely overwritten with new instruction bytes and new predecode information. When predecode unit 12 receives a prefetch or fetch request for instruction bytes that have been output to cache 50, predecode unit 12 outputs the requested address to cache 50. If cache 50 is still storing the corresponding instruction bytes and predecode information (i.e., they have not been replaced), then cache 50 may be configured to convey them to predecode unit 12. Predecode unit 12 may forward the instruction bytes and corresponding predecode information to instruction alignment unit 18 and instruction cache 16. Advantageously, in this embodiment, the process of generating new predecode information for the requested instruction bytes may be bypassed. As previously noted, this might be particularly advantageous in some embodiments of microprocessor 10 when a branch mispredict and or cache miss occurs and functional units 24A–C are in danger of stalling.

If, on the other hand, cache 50 has replaced the desired instruction bytes with other instruction bytes located at another address, cache 50 may be configured to retrieve the requested bytes from main memory and convey them to predecode unit 12. Cache 50 may be configured to assert a particular control signal when transmitting the instruction bytes to predecode unit 12 to indicate that instruction cache 50 does not have valid predecode information for the instruction bytes being transmitted.

In another embodiment, a control unit 80 may monitor cache 50 and store an particular invalidation sequence of predecode bits into parity/ECC storage locations 60 that correspond to an instruction storage location 58 that is being replaced with new instruction bytes from main memory. This effectively "initializes" the predecode information for the new instruction bytes. In this configuration, cache 50 may be configured to output the invalidation sequence of predecode bits when the corresponding instruction bytes are requested by predecode unit 12. Advantageously, in this configuration cache 50 may be a standard cache that supports parity/ECC and need not be modified in any way to be aware of whether the predecode bits it is outputting are valid or invalid. Instead, predecode unit 12 may be configured to examine the predecode bits it receives from cache 50. If the predecode bits match the predetermined invalidation sequence, prefetch unit 12 may be configured to calculate new predecode information. If the predecode bits do not match the predetermined invalidation sequence, prefetch unit 12 may be configured to forward the predecode bits from level two cache 50 to instruction cache 16 (and alignment unit 16/decode units 20A–C, if necessary).

Note that buses 56 and 68 may be of any convenient size, e.g., 16, 32, 64, or 128 bits. The number of bus lines used may be reduced by multiplexing data, address, and control buses. In some embodiments, predecode unit 12 and level two cache 50 may be configured to generate parity bits for addresses conveyed and received. These parity bits, however, need not be stored and may be discarded after each address is conveyed.

In yet another embodiment, predecode information in addition to start bits may be generated by predecode unit 12 and stored in instruction cache 16. For example, end bits which identify whether their associated instruction byte is the final byte of an instruction, and opcode bytes which indicate whether their associated instruction byte is an opcode byte, may also be generated by predecode unit 12 and stored in instruction cache 16. Some or all of these predecode bits may be conveyed to cache 50 when the instruction bytes are replaced in cache 16, depending upon the number of parity and or ECC bits 60 available within cache 50.

In some embodiments, decode units 20A–C may be configured to detect when the predecode information provided by predecode unit 12 or read from instruction cache 16 is incorrect. Inaccuracies in the predecode information may occur for differing reasons depending upon the method used to produce the predecode information. In the event of inaccurate predecode information, decode units 20A–C may be configured to stall while predecode unit 12 re-generates the predecode information. The new predecode information may then be written to instruction cache 16 over the inaccurate predecode information. In another embodiment, decode units 20A–C may be configured to simply discard the inaccurate predecode information and complete decoding themselves.

Figure 5:
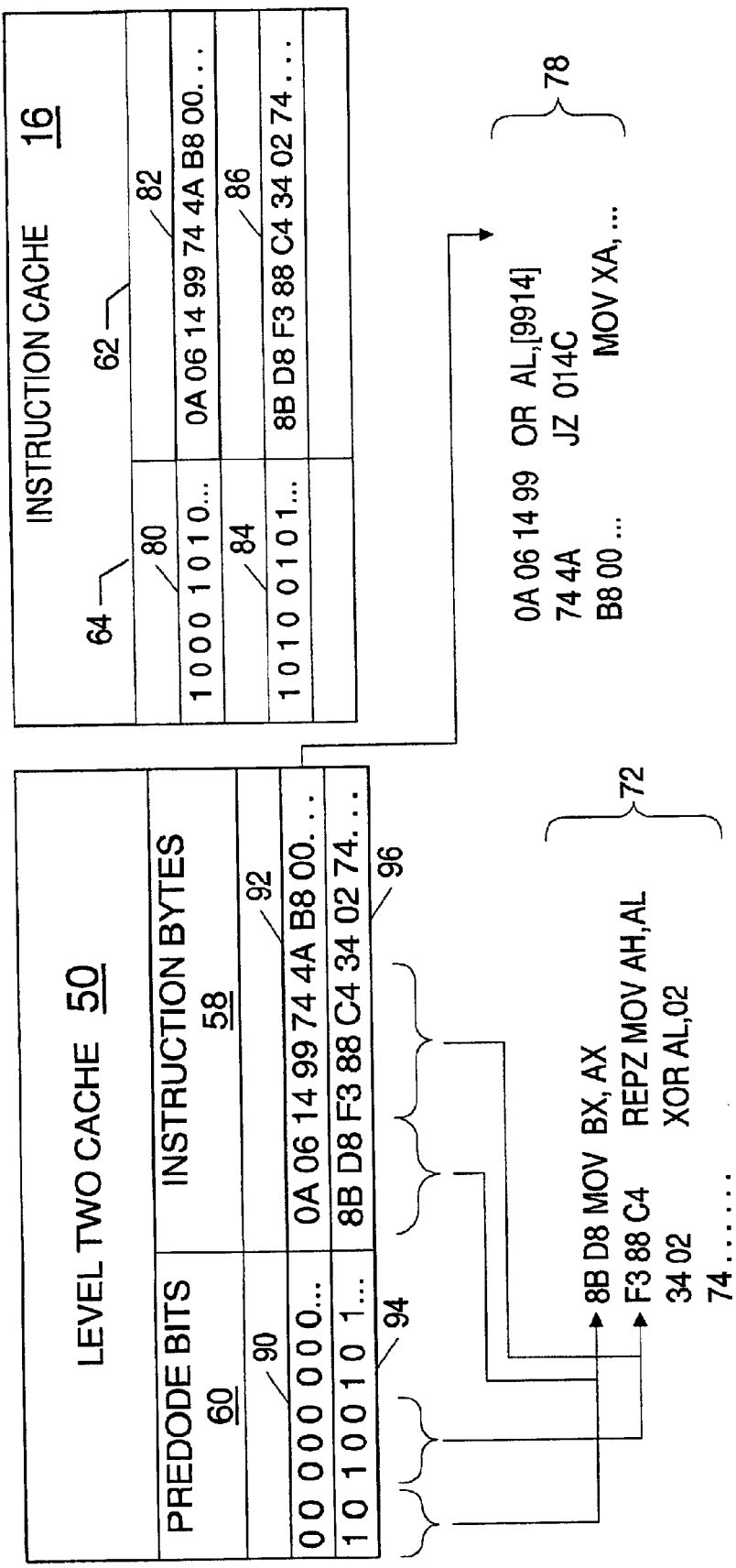
FIG. 5 is diagram illustrating details of the relationship between one embodiment of the instruction cache depicted in FIG. 4 and one embodiment of the level two cache from FIG. 4.

Turning now to FIG. 5, more details of one embodiment of instruction cache 16 and cache 50 are shown. As previously described, instruction cache 16 may be configured with instruction storage locations 62 and predecode information storage locations 64. Each predecode information storage location corresponds to one instruction storage location. For example, the predecode information stored in storage location 80 corresponds to the instruction bytes stored in instruction storage location 82. In the embodiment illustrated in the figure, storage location 80 stores start bits corresponding to each instruction byte stored in location 82.

As shown in the figure, cache 50 may store the same instruction bytes as instruction cache 16. For example, when the instructions from code segment 72 are requested for the first time, they may be read from main memory into level two cache 50 and instruction cache 16. Note, however, that level two cache 50 will not have predecode data for code segment 72. Thus, the predetermined invalidation constant (in this case, 00000000 . . . ) is stored in location 90. When predecode unit 12 receives the instruction bytes, it will detect the invalidation constant and proceed to calculate predecode information for code segment 72. This predecode information is then stored in storage location 80 within instruction cache 16.

The same process will occur the first time the instructions in code segment 78 are requested. However, once the instruction bytes for code segment 78 are replaced in instruction cache 16, the predecode information is written back to level two cache 50 and stored in location 94. If code segment 78 is requested again after it has been replaced in instruction cache 16 and before it has been replaced in level two cache 50, both the instruction bytes and the predecode information for code segment 78 may be read from locations 94–96 and stored in instruction cache 16. This state is illustrated in the figure.

While any predetermined sequence of bits may be used as an invalidation constant, in some embodiments it may advantageous to select a predecode bit sequence that is unlikely to be generated by predecode unit 12. For example, assuming a maximum instruction length of 16 bytes and a cacheline length of 32-bytes, it is unlikely that predecode unit 12 will receive a cache line having 32 consecutive instruction bytes without at least one starting byte. Thus, selecting an invalidation constant comprising 32 zeros may be advantageous because it may reduce the number of false invalidations. A false invalidation may occur when the predecode bits calculated by predecode unit 12 equal the predetermined invalidation constant. If this occurs, the original predecode bits read from cache 50 will be discarded and new predecode bits may be calculated, even though the original predecode bits were correct.

In one embodiment, the features described above may be implemented solely within microprocessor 10. For example, the functionality of control unit 80 may be omitted or may be contained within microprocessor 10. Similarly, bus interface logic 52 may also be omitted or contained within microprocessor 10 in some embodiments. Implementing the functions described entirely within microprocessor 10 may advantageously reduce the cost of implementing a computer system that stores predecode information as disclosed. In other embodiments, the desired functions may be spread between microprocessor 10 and one or more interface or support chips.

Figure 6:
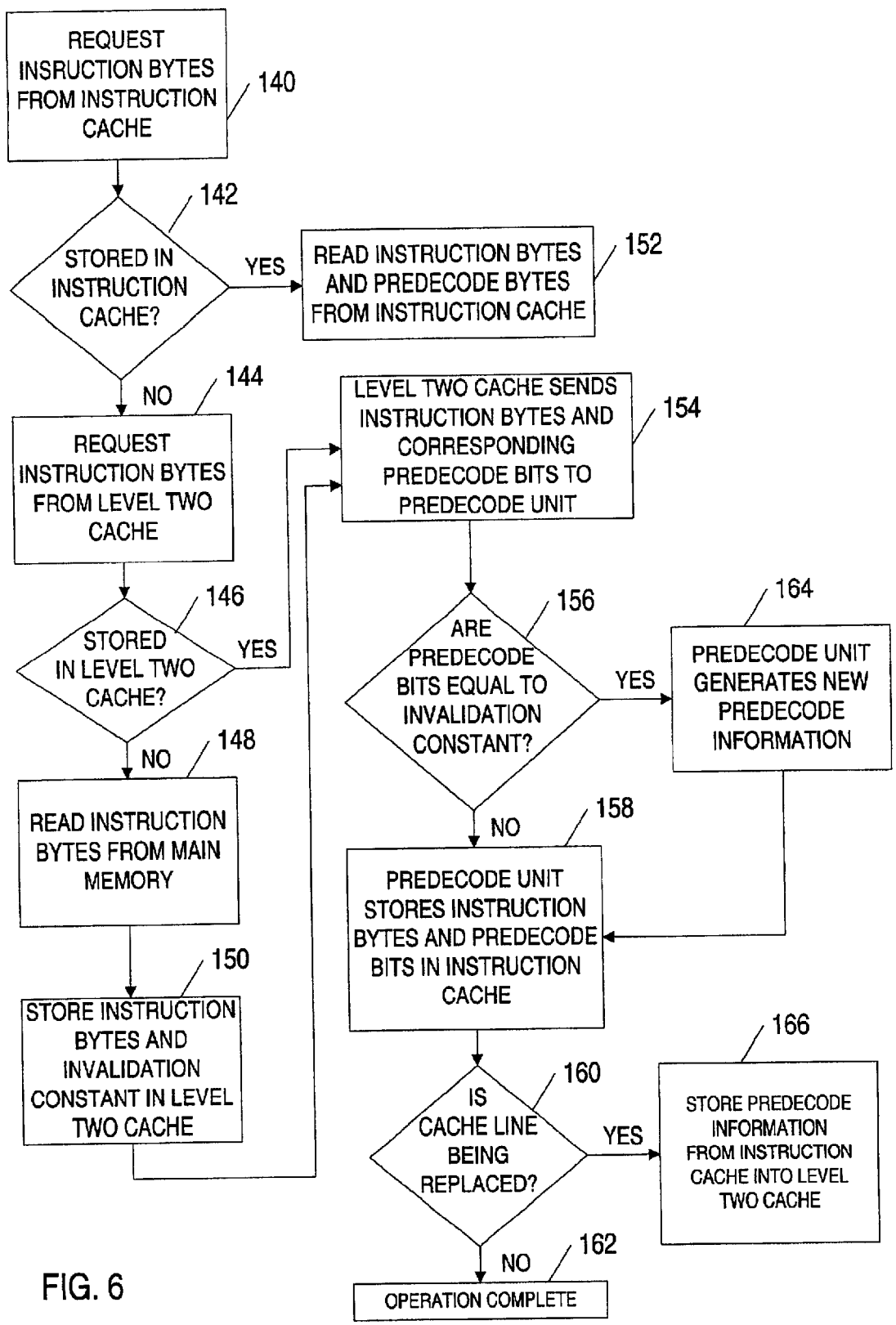
FIG. 6 is a flowchart depicting one embodiment of a method for storing predecode information in a level two cache.

Turning now to FIG. 6, a flowchart illustrating one embodiment of a method for storing predecode information in level two cache 50 is shown. First, instruction bytes are requested from instruction cache 16 (step 140). If the requested bytes are stored within instruction cache 16, they are conveyed to alignment unit 16 and decode units 20A–C along with their corresponding predecode information (steps 142 and 152). If, on the other hand, the requested instruction bytes are not stored within instruction cache 16, the requested address is forwarded to level two cache 50 (steps 142 and 144). If the requested instruction bytes are not stored in level two cache 50, then they are read from the main memory subsystem (steps 146 and 148). When the requested instruction bytes are received from the main memory subsystem, they are stored in level two cache 50 along with an invalidation constant (steps 148 and 150). As previously noted, the invalidation constant effectively initializes the predecode storage location within level two cache 50, thereby signaling to predecode unit 12 that new predecode information should be generated. When predecode unit 12 receives the instruction bytes and the predecode bits, the predecode bits are examined to determine if they equal the invalidation constant (steps 154 and 156). If the predecode bits equal the invalidation constant, predecode unit 12 is configured to generate new predecode information (steps 156 and 164). The instruction bytes and new predecode information are then stored in instruction cache 16 (step 158). If storing the instruction bytes and new predecode information entails replacing a previously stored cache line within instruction cache 16, the predecode information corresponding to the previously stored cache line that is being overwritten is stored back to level two cache 50 (steps 160 and 166).

Note that the steps in the figure are portrayed in a serial manner for explanatory purposes only. Other embodiments are possible and contemplated. A number of the steps above may be combined or performed in parallel. For example, steps 150 and 154 may be performed in parallel. Furthermore, as previously noted, the steps involving the use of an invalidation constant are optional.

Storing Parity and/or ECC Information with Victimized Instruction and Data Bytes One disadvantage of the embodiments described above is that instruction and data bytes stored in the level two cache are unprotected from single and multiple bit errors as a result of the parity and/or ECC (error checking and correction) bits being used to store predecode information. However, in some embodiments the method and systems described above may be modified in order to provide at least some protection for single and/or multiple bit errors to data and instruction bytes stored in the level two cache.

Figure 7A:
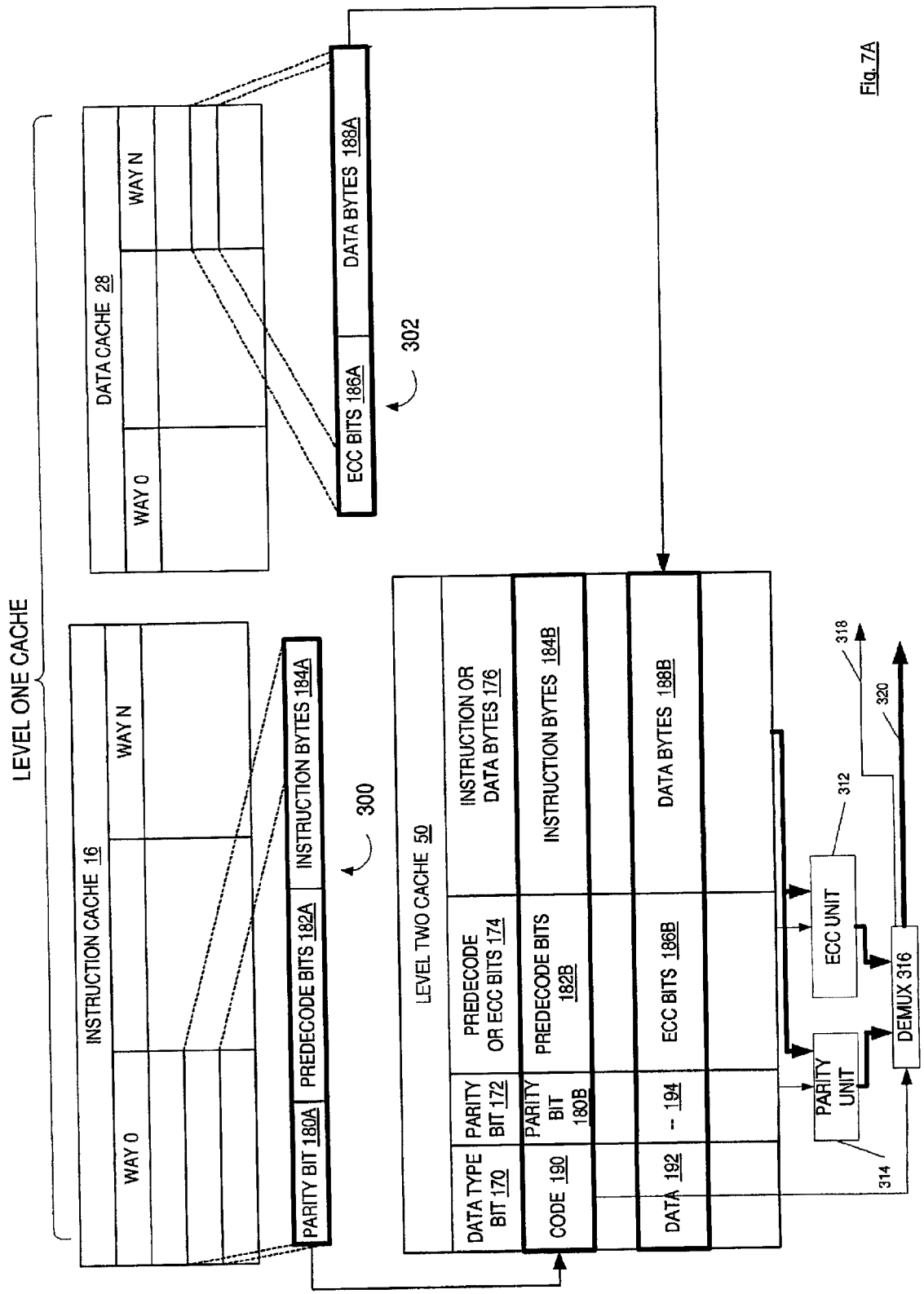
FIGS. 7A–B are diagrams illustrating different embodiments of a system for storing victimized predecode information.

Turning now to FIG. 7A, one such embodiment of a system for storing predecode information in a level two cache while also protecting stored instruction and data bytes from single and multiple bit errors is shown. Caches are often configured into logical rows and/or columns often referred to as cache lines. As shown in the figure, each cache line in instruction cache 16 may store a parity bit 180A and predecode information 182A that correspond to stored instruction bytes 184A. As described in connection with the previous embodiments, predecode bits 182A provide information about instructions bytes 184A (e.g., start byte, end byte, and opcode byte information). As previously noted, predecode bits 182A may be used to reduce the time required to decode instruction bytes 184A. For example, predecode bits 182A indicative of start and end bytes within instruction bytes 184A may be used to rapidly align instructions within instruction bytes 184A. Parity bit 180A may be calculated to generate either even parity or odd parity based on the sum of predecode bits 182A and instruction bytes 184A. In another embodiment, parity bit 180A may be calculated based solely upon instruction bytes 184A (i.e., providing the ability to detect odd numbers of bit errors within instruction bytes 184A only). In this embodiment, potentially more protection may be provided to instruction bytes 184A, while predecode bits 182A are left unprotected. This may be acceptable in embodiments where predecode bits 182A are merely predictive. For example, predecode bits 182A may later be determined to be invalid.

Data cache 28 may also be configured with a number of cache lines. Each cache line may have its own set of data bytes 188A and corresponding ECC bits 186A. As described above, ECC bits 186A may be selected to allow the detection of single and some multiple bit errors in data bytes 188A. In some embodiments, ECC bits 186A may also be selected according to an algorithm that allows single bit errors to be detected and corrected.

As used herein, ECC information refers to error correction code information. In digital electronic systems, information is represented in binary format (i.e., ones and zeros). When binary information is passed from one point to another, or stored in a memory, there is always a chance that an error can occur. For example, a one may be interpreted as a zero, or a zero may be interpreted as a one. This may be caused by media defects, electronic noise, component failures, poor connections, deterioration due to age, radiation, and other factors. When a bit is mistakenly interpreted, a "bit error" is said to have occurred. Error correction is the process of detecting the errors and correcting these bit errors. Error correction may be performed in hardware or software, although for high data rates error correction is preferably performed in special purpose hardware because software solutions are typically too slow. As memory densities and operating frequencies increase, the probability of having single or multiple bit errors may also increase. Thus, supporting error correction codes may become more important. For example, in some portable systems error correction codes are now being relied upon to extend the battery life of the system by allowing a significant reduction in the memory refresh rate. Advantageously, the systems and methods disclosed herein may be implemented using a number of different ECC algorithms. The particular selection of algorithm may depend upon the memory structure and the number of bits available for storing the ECC information. Further note that in some embodiments, the ECC bits 186A and data bytes 188A may be combined as part of the ECC algorithm.

As used herein, parity checking is a rudimentary method of detecting single bit errors in a memory system. Parity supporting memory typically provides one extra bit of memory storage for every byte, but other configurations are possible. This extra bit is used to store information to allow error detection. Every byte of data that is stored in this system memory contains eight bits of real data, each bit being a one or a zero. Thus, it is possible to count up the number of zeros or ones in a byte. For example, the byte 10110011 has three zeros and five ones. The byte 00100100 has six zeros and two ones. Thus, some bytes will have an even number of ones and some will have an odd number of ones. When parity checking is enabled, each time a byte is written into memory, a logic circuit called a parity generator/checker examines the byte and determines whether the data byte has an even or an odd number of ones. If it has an even number of ones, the ninth (or parity) bit is set to a one, otherwise it is set to a zero. The result is that no matter how many ones there were in the original eight data bits, there are always an odd number of ones when all nine bits are examined together. This implementation is called "odd parity". It is also possible to have even parity, where the parity generator/checker makes the sum always come out even.

When the data is read back from memory, the parity circuit this time acts as a checker. It reads back all nine bits and determines if there are an odd number or even number of ones. If there are an even number of ones, there must have been an error in an odd number of the bits. This is how parity memory is used to detect single bit errors. The parity generator/checker circuit will be able to determine that one bit is incorrect, although unlike the ECC example above, it will not be able to determine which bit is incorrect. Advantageously, parity generation and checking may be performed in parallel with the reading and writing operation of the memory. Thus, parity generation and checking need not slow down the operation of the memory system.

Error checking and correction codes may also be performed in parallel in some embodiments. In other embodiments it may performed as a serial operation, thereby causing a slight slow down in system operation because of the time that is allowed for the error checking and correction circuit to correct any detected errors. This delay, however, is dependent upon the memory architecture implementation and may be relatively low (e.g., two to three percent).

Turning back to FIG. 7A, in one embodiment, instruction and data cache 28 may be configured in a set associative manner. Thus, each set may include a number of "ways" corresponding to a column. ECC bits 186A may correspond to the data in a particular cache line (i.e., the intersection of a single column and row or a single way). Instruction cache 16 may also be configured in a similar manner. Thus, each cache line in instruction cache 16 may have its own set of parity and predecode bits 180A and 182A. In some embodiments, level two cache 50 may be implemented on the die of processor 10. Advantageously, this may allow level two cache 50 to operate at the same frequency as processor 10.

In one embodiment, level two cache 50 may be configured as an "exclusive" cache that contains only victimized or copy-back cache blocks that are to be written back to the memory subsystem as a result of a conflict miss. These terms, victimized or copy-back, refer to cache blocks that were previously held in the level one cache (i.e., instruction cache 16 and data cache 28) but had to be overwritten (victimized or evicted) to make room for newer data. In one embodiment, level two cache 50 may be 256 kilobytes and instruction cache 16 and data cache 28 may be 64 kilobytes each, thereby providing processor 10 with a total dedicated storage space of 384 kilobytes. Note, these cache sizes are examples and other sizes may be possible depending on the exact implementation of processor 10. Similarly, level two cache 50 may be implemented off chip relative to processor 10. In other embodiments, level two cache 50 may be implemented as an "inclusive" cache that includes a copy of all data in instruction cache 16 and data cache 28. Furthermore, in some embodiments instruction cache 16 and data cache 28 may have different sizes. Level two cache 50 may also be implemented as a set associative cache in some embodiments.

As shown in the figure, once a particular cache line in instruction cache 16 is needed to store new instruction bytes, the previously predecoded instruction bytes (182A and 184A) are "victimized". Since level two cache 50 may store either (a) instruction bytes with predecode information and parity information or (b) data bytes with ECC information, an indicator bit (e.g., code indicator bit 190) may be stored to indicate what type of information is stored therein. The identifier bit 190 may be used by the demux 316 in order to select whether the output from parity checking unit 314 or error checking and correction unit 312 as output 320. Demux 316 may also be configured to assert or output an error interrupt signal 318 in response to receiving an error indication from parity checking unit 314 or error checking and correction unit 312. For example, in the event that parity checking unit 314 determines that a parity error has occurred, demux 316 may be configured to assert interrupt signal 318. Similarly, demux 316 may be configured to assert error signal 318 in response to a corresponding error signal from error checking and correction unit 312. As shown in the figure, error checking and correction unit 312 may be configured to receive ECC bits 186B and data bytes 188B.

Parity checking unit 314 may be configured to receive parity bit 180B, predecode bits 182B, and instruction bytes 184B. As noted above, parity bit 180B may be generated by determining the number of asserted bits in predecode bits 182B and instruction bytes 184B. As shown in the figure, indicator bits 190 and 192 may indicate whether instruction code or data bytes are stored in the corresponding cache line of level two cache 50. Demux 316 may be configured to receive the indicator or data type bits 170 (e.g., bits 190 and 192) in order to select the output from parity checking unit 314 or ECC unit 312.

As shown in the figure, one parity bit 180A may be stored for each cache line in instruction cache 16. For example, parity bit 180A may be used to indicate parity for cache line 300. Similarly, ECC bits 186A may be used to provide error checking and correction for data bytes 188A within cache line 302 in data cache 28. While level two cache 50 is shown as a direct-mapped cache, level two cache 50 may be implemented as a set associative or fully associative cache with multiple columns or "ways". As shown in the figure, level one cache lines 300 and 302 may be written into level two cache 50 in response to the data being overwritten (i.e., victimized) by new data that is being written into instruction cache 16 and data cache 28.

While not shown in the figure, parity unit 314 may also be used to check parity for reads from instruction cache 16 (i.e., including reads for instructions that are forwarded to the processor's alignment, decode, and execution units, and reads for victimized instructions bound for level two cache 50). In another embodiment, another instance of parity unit 314 may be implemented to provide this functionality. Similarly, error checking and correction unit 312 (or another instance thereof) may also be used to perform error checking and correction for reads from data cache 28.

In one embodiment, level two cache 50 may be implemented in two parts, with each part storing a different type of information. For example, the first part of level two cache 50 may be configured to exclusively store instruction bytes and corresponding predecode bits and parity bits. The second portion of level two cache 50 may be configured to exclusively store data bytes and ECC bits. Advantageously, this embodiment of level two cache may potentially reduce the need to store data type bits 170 (e.g., code bit 190 and data bit 192). However, this type of configuration may potentially reduce the efficiency of level two cache 50 when different programs are executed that have different ratios of instruction bytes to data bytes. Note, data type bits 170 may be generated by identifying which part of the level one cache the information comes from (i.e., instruction cache 16 or data cache 28). For example, information from instruction cache 15 may automatically receive a data type bit indicating that it is instruction code information. Similarly, information to be stored into level two cache 50 coming from data cache 28, may automatically receive a data type indicator bit that indicates the information is data (e.g., data bit 192).

Figure 7B:
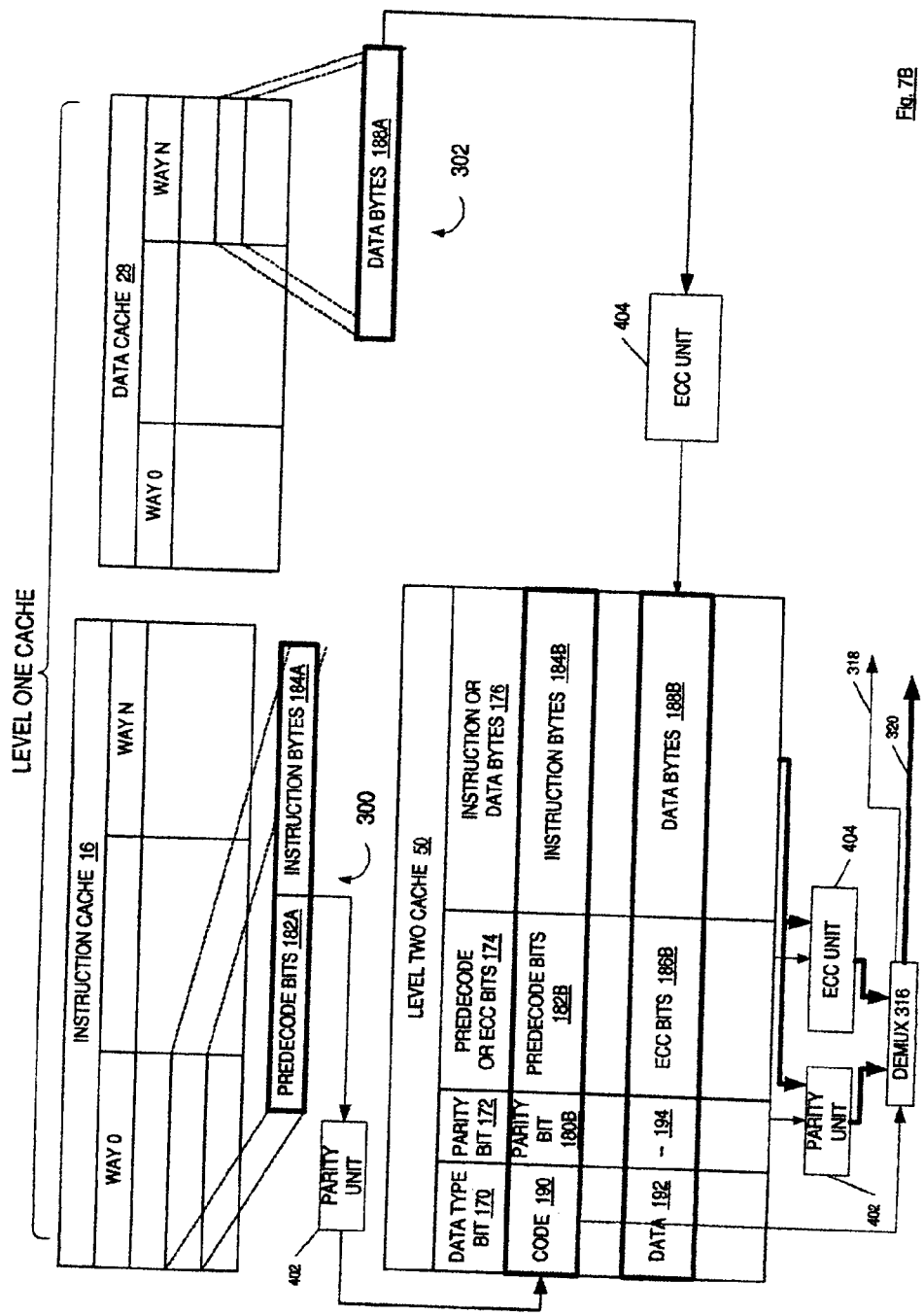

Turning now to FIG. 7B, another embodiment of the system for storing victimized instruction bytes and predecode information is shown. In this embodiment, parity information is not stored in instruction cache 16, and ECC information is not stored in data cache 28. This may advantageously reduce the die space needed to implement instruction cache 16 and data cache 28. Instead, parity unit 402 may generate parity bits for instruction bytes 184A as they are read out of instruction cache 16 and written to level two cache 50. Similarly, level two cache may be configured to generate ECC bits for data bytes 188A as they are read out of data cache 28 and stored to level two cache 50. The remainder of the system may operate in a similar fashion to the embodiment of FIG. 7A.

Figure 8A:
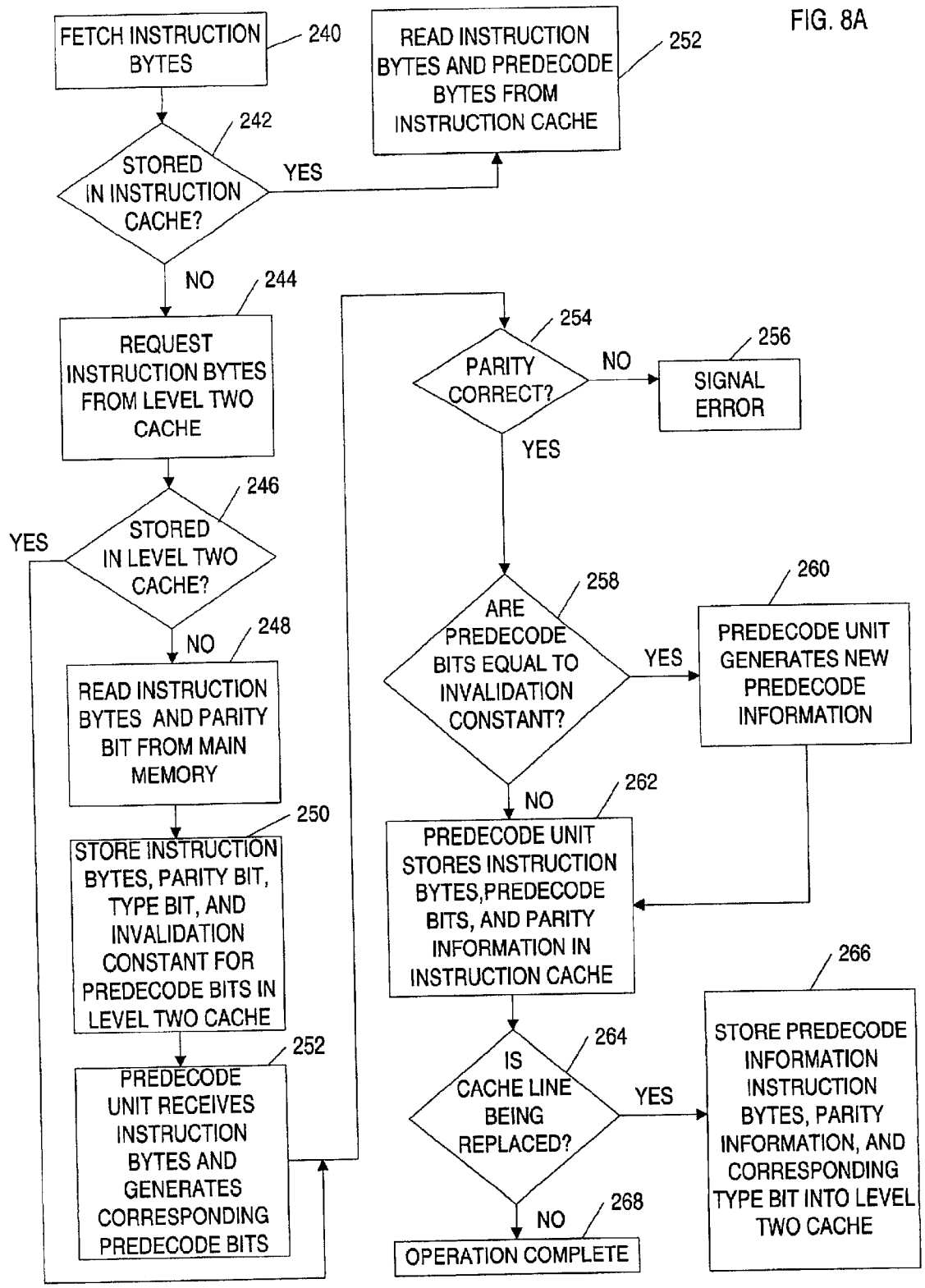
FIGS. 8A–B are flowcharts illustrating different embodiments of a method for storing victimized predecode information.

Turning now to FIG. 8A, one embodiment of a method for storing predecode information is shown. In this embodiment, a fetch is initiated in order to load a set of desired instruction bytes (step 240). In response to the fetch, the instruction cache is searched to determine whether or not the instruction cache stores the desired instruction bytes (step 242). If the instruction cache does store the desired instruction bytes, the instruction bytes and corresponding predecode information are read from the instruction cache (step 252). This is referred to as a "instruction cache hit", and is typically preferable since the instruction cache typically has lower latency than the rest of the memory system. If, however, the desired instruction bytes are not stored in an instruction cache, then the instruction bytes may be requested from the level two cache (step 244). As noted above, in some embodiments the level two cache may be implemented on the same chip or die as the processor and level one cache. If the desired information is not stored in the level two cache (step 246), the instruction bytes and corresponding parity information may be read from main memory (step 248). As those skilled in the art will appreciate, there may be additional levels of cache beyond the level two cache as part of the main memory subsystem. In some embodiments, the main memory subsystem may be configured to support parity information or ECC. For example, the main memory subsystem may be configured to store parity bits or ECC bits for data written to the main memory and read from the main memory. However, in other embodiments, the main memory subsystem may not store or support parity and/or ECC information.

In some embodiments, the level two cache may be configured to store a duplicate copy of all information in the level one cache. In these embodiments, the instruction bytes read from main memory may be stored to the level two cache together with a parity bit and an indicator bit (e.g., data type bit) together with an invalidation constant for the predecode bits which have not yet been generated for the instruction bytes. If the predecode bits have already been generated, or once they have been generated, they may be stored into the level two cache over-writing the invalidation constant (step 250). As noted above, however, in other embodiments the level two cache may be "exclusive", thereby only storing victimized information from the level one cache. In these embodiments, the instruction bytes read from the main memory subsystem may not be stored to the level two cache at this point in the process. Once the instruction bytes have been received from the main memory subsystem, one or more predecode units may be configured to generate predecode bits for the instruction bytes (step 252).

In embodiments that support parity checking for information read from main memory, the predecode unit (or a parity unit) may be configured to check parity to insure that the data was correctly received from main memory (step 254). Note, in some embodiments the parity detection may be performed in parallel or before the predecode unit generates the corresponding predecode bits. If there is an error, the predecode unit may be configured to assert an error signal or interrupt to the processor (step 256). If the parity check does not indicate an error, the predecode bits read from the main memory subsystem may be examined to determine whether or not they are equal to the invalidation constant (step 258).

If the predecode bits are equal to the invalidation constant, the predecode unit may be configured to generate new predecode information (step 260). If the predecode bits are not equal to the invalidation constant, then the predecode unit may be configured to store the instruction bytes and the previously generated predecode bits into the instruction cache (step 262). Note, in some embodiments, the instruction cache may also be configured to store parity bits for the instruction bytes. In other embodiments, the parity bits for the instruction bytes may be generated once the instruction bytes are read out of the instruction cache and stored into the level two cache (i.e., upon victimization). Thus, in some embodiments parity checking may be performed only for the level two cache. In other embodiments, parity checking may be performed for both the instruction cache (i.e., the level one cache) and the level two cache. Furthermore, parity checking may also be performed for the main memory subsystem in some implementations.

If the predecode bits are equal to the invalidation constant, the predecode unit may be configured to store the instruction bytes, the predecode bits, and parity information into the instruction cache (step 262). If the data is immediately needed, then the instruction bytes may also be provided to the decoding units for processing. At some later point in time, the corresponding cache line in the instruction cache that is storing the instruction bytes and predecode information may be overwritten or victimized (step 264). In this event, the predecode information and instruction bytes from instruction cache may be stored into the level two cache with a corresponding parity bit and a data type bit (step 266).

Figure 8B:
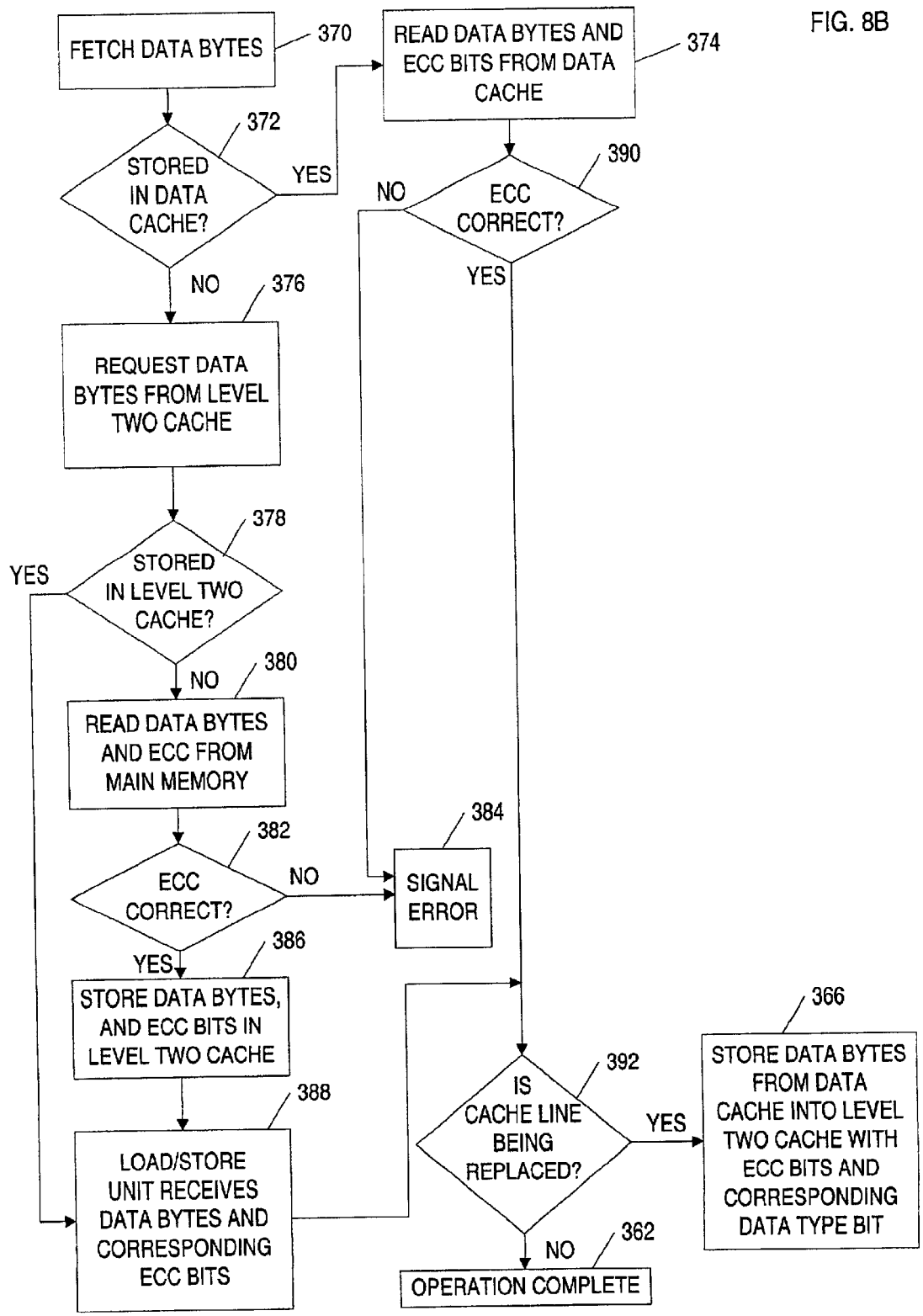

Turning now to FIG. 8B, one embodiment of a method for dealing with victimized data bytes is shown. First, data bytes may be requested or fetched by the load/store unit (step 370). As part of this fetching process, the level one cache or data cache may be examined to determine if the desired data bytes are stored therein (step 372). If the data bytes are stored in the data cache, they may be read from the data cache along with their corresponding ECC information (step 374). If, however, the desired data bytes are not stored in the data cache, the data may be requested from the level two cache (step 376). If the data is not stored in the level two cache (step 378), the desired data bytes may be read from main memory (step 380).

As previously noted, similar to the parity information discussed in connection with FIG. 8A, ECC information may be supported (a) only in the level two cache, (b) in both the level one cache and the level two cache, or (c) in the level one cache, level two cache, and main memory subsystem. Other combinations are also possible (e.g., in the main memory subsystem and the level two cache only). For embodiments that support ECC information from the main memory, once the data bytes are received from the main memory subsystem, the corresponding ECC information may be checked (step 282). If the information is incorrect, the error checking and correction unit may attempt to correct the error. If the error is uncorrectable, then an error may be signaled (step 384). If the ECC information is correct (or the error is corrected), then the ECC information along with the data bytes may be stored in the level two cache (step 386). As previously noted in connection with FIG. 8A, this example assumes an inclusive level two cache. In some embodiments the level two cache may be exclusive, and the data read directly from main memory may not be stored in the level two cache until it is victimized in the level one cache.

At some later point in time, the level one cache line storing the data bytes and ECC information may be victimized or overwritten (step 392). In this event, the data bytes from the data cache may be stored into the level two cache along with the corresponding ECC bits and a data type bit (step 366). The data type bit may be used to indicate that the stored information is data and ECC information (as opposed to instruction bytes with parity and predecode information).

Figure 9:
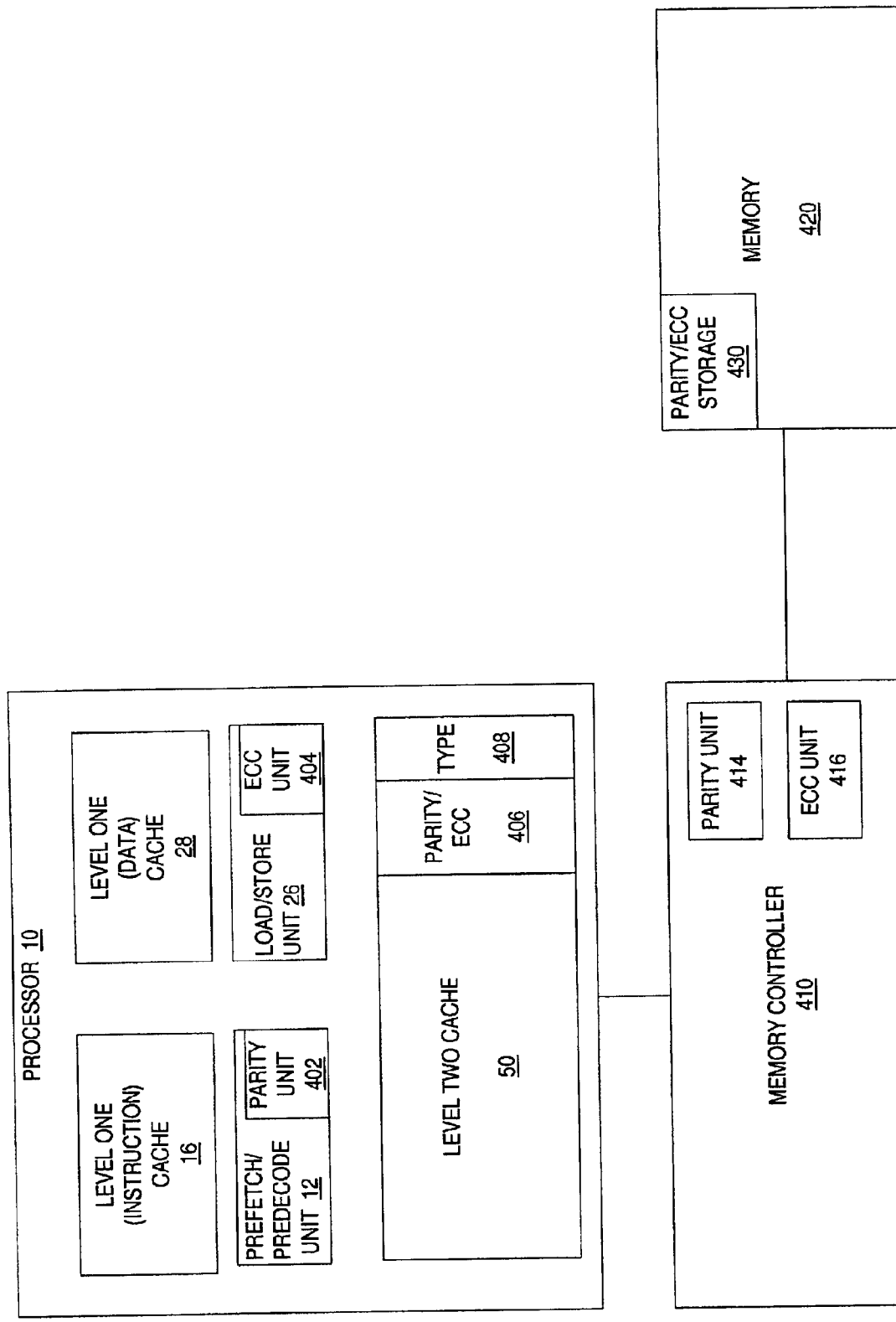
FIG. 9 is a diagram of another embodiment of a system for storing victimized predecode information.

Turning now to FIG. 9, one embodiment of a computer system configured to store predecode information for victimized instruction bytes while still providing parity and/or ECC protection for victimized data bytes is shown. In this embodiment, processor 10 includes level one instruction cache 16 and level one data cache 28. Processor 10 also includes predecode/prefetch unit 12 and load/store unit 26. As shown in the figure, prefetch/predecode unit and load/store unit 26 may each include a parity generation and checking unit 402 and error checking and correction unit 404, respectively.

In this embodiment, level 2 cache 50 is configured with a number of storage locations 406 configured to store parity and/or ECC information for the corresponding bytes stored in the main level 2 cache 50. In this embodiment, the computer system also includes a memory controller 410. Memory controller 410 may include parity unit 414, which is configured to generate and check parity for bytes coming from main memory 420. For embodiments in which parity is supported, main memory subsystem 420 may be configured with additional memory storage locations for storing parity information 430.

In other embodiments, memory controller 410 may include error checking and correction unit 416 configured to generate and check error correction codes for information stored in main memory subsystem 420. Note, additional error checking and correction information may be generated for the buses used to transfer the information between memory 420, memory controller 410, and processor 10. This information may be in addition to the ECC and/or parity information discussed herein. As previously described, in some embodiments memory subsystem 420 and memory controller 410 may be configured without support for parity and/or ECC information. As also shown in the figure, in some embodiments level two cache 50 may be configured to store data type bits 408 for each cache line.

Single bit errors detected through the use of parity bits in the level one instruction cache 16 may be corrected by discarding the cache line and reading the corresponding instruction bytes from memory 420 (which may itself be protected by ECC information). In contrast, the data stored in level one data cache 28 may be modified, thereby preventing the original copy of the data in memory 420 (i.e., the stale copy) from being used to correct errors. Thus, having ECC information in data cache 28 may be particularly useful in some embodiments to provide an alternate mechanism for correcting errors in lieu of copying data bytes from memory 420.

Example Computer System

Figure 10:
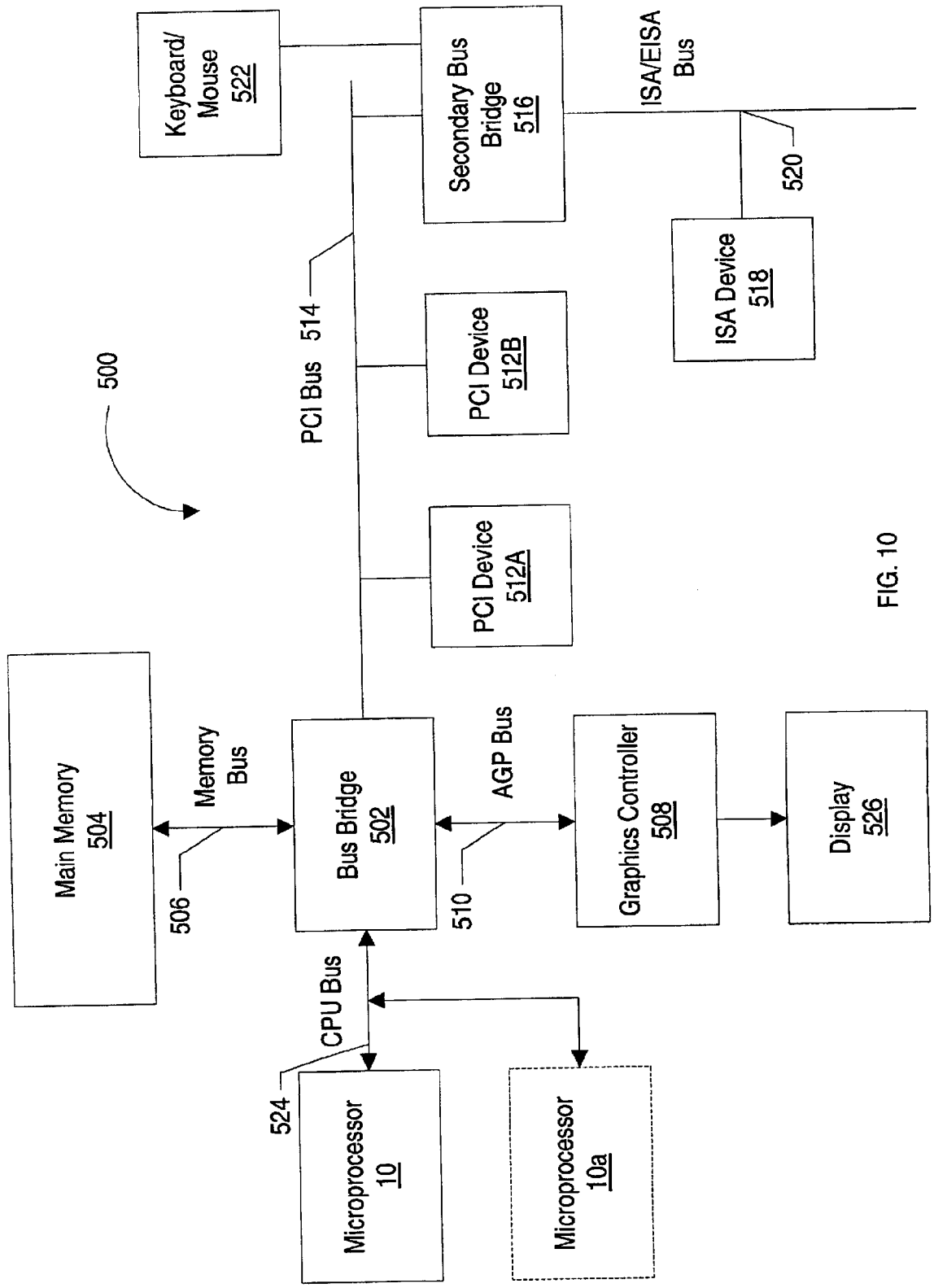
FIG. 10 is a diagram showing one embodiment of a computer system utilizing the microprocessor of FIG. 3.

Turning now to FIG. 10, a block diagram of one embodiment of a computer system 500 utilizing microprocessor 10 is shown. In the depicted system, a main memory 504 is coupled to bus bridge 502 (which may act as a memory controller) through a memory bus 506, and a graphics controller 508 is coupled to bus bridge 502 through an AGP bus 510. Finally, a plurality of PCI devices 512A–512B are coupled to bus bridge 502 through a PCI bus 514. A secondary bus bridge 516 may further be provided to accommodate an electrical interface to one or more EISA or ISA devices 518 through an EISA/ISA bus 520. Microprocessor 10 is coupled to bus bridge 502 through a CPU bus 524.

Bus bridge 502 provides an interface between microprocessor 10, main memory 504, graphics controller 508, and devices attached to PCI bus 214. When an operation is received from one of the devices connected to bus bridge 502, bus bridge 502 identifies the target of the operation (e.g. a particular device or, in the case of PCI bus 514, that the target is on PCI bus 514). Bus bridge 502 routes the operation to the targeted device. Bus bridge 502 generally translates an operation from the protocol used by the source device or bus to the protocol used by the target device or bus.

In addition to providing an interface to an ISA/EISA bus for PCI bus 514, secondary bus bridge 516 may further incorporate additional functionality, as desired. For example, in one embodiment, secondary bus bridge 516 includes a master PCI arbiter (not shown) for arbitrating ownership of PCI bus 514. An input/output controller (not shown), either external from or integrated with secondary bus bridge 516, may also be included within computer system 500 to provide operational support for a keyboard and mouse 522 and for various serial and parallel ports, as desired. An external cache unit (not shown) may further be coupled to CPU bus 524 between microprocessor 10 and bus bridge 502 in other embodiments. Alternatively, the external cache may be coupled to bus bridge 502 and cache control logic for the external cache may be integrated into bus bridge 502.

Main memory 504 is a memory in which application programs are stored and from which microprocessor 10 primarily executes. A suitable main memory 504 comprises DRAM (Dynamic Random Access Memory), and preferably a plurality of banks of SDRAM (Synchronous DRAM).

PCI devices 512A–512B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 518 is illustrative of various types of peripheral devices, such as a modem, a sound card, and a variety of data acquisition cards such as GPIB or field bus interface cards.

Graphics controller 508 is provided to control the rendering of text and images on a display 526. Graphics controller 508 may embody a typical graphics accelerator generally known in the art to render three-dimensional data structures which can be effectively shifted into and from main memory 504. Graphics controller 508 may therefore be a master of AGP bus 510 in that it can request and receive access to a target interface within bus bridge 502 to thereby obtain access to main memory 504. A dedicated graphics bus accommodates rapid retrieval of data from main memory 504. For certain operations, graphics controller 508 may further be configured to generate PCI protocol transactions on AGP bus 510. The AGP interface of bus bridge 502 may thus include functionality to support both AGP protocol transactions as well as PCI protocol target and initiator transactions. Display 526 is any electronic display upon which an image or text can be presented. A suitable display 526 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 500 may be a multiprocessing computer system including additional microprocessors.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

A system and method for storing predecode information and victimized instruction and/or data bytes has been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A microprocessor comprising:
   a predecode unit configured to receive instruction bytes and generate corresponding predecode information;
   an instruction cache coupled to the predecode unit and configured to store the instruction bytes and the predecode information corresponding to the instruction bytes,
   a load/store unit configured to receive data bytes;
   a data cache configured to receive and store the data bytes from the load/store unit, and
   a level two cache configured to receive and store victimized instruction bytes from the instruction cache and victimized data bytes from the data cache, wherein the level two cache is configured to receive and store parity information and predecode information for the stored victimized instruction bytes, and wherein the level two cache is configured to receive and store error correction code bits for the stored victimized data bytes.

2. The microprocessor of claim 1, further including parity generation and checking logic configured to:
   generate the parity bits for the instruction bytes transferred to the level two cache, and
   check the parity bits for the instruction bytes transferred from the level two cache.

3. The microprocessor of claim 1, wherein the level two cache is divided into cache lines, wherein the cache lines include a first storage area and a second storage area, wherein each cache line is configured to store one or more indicator bits indicative of whether: (a) instruction bytes are stored in the cache line's first storage area, and predecode bits and a parity bit are stored in the cache line's second area, or (b) data bytes are stored in the cache line's first storage area and error correction code bits are stored in the cache line's second storage area.

4. The microprocessor of claim 1, further including error checking and correction logic configured to:
   generate the error correction code bits for the data bytes transferred to the level two cache, and
   check the error correction code bits for the data bytes transferred from the level two cache.

5. The microprocessor of claim 4, wherein the error checking and correction logic is configured to use the error correction code bits to correct at least one bit errors in the data bytes transferred from the level two cache.

6. An apparatus comprising:
   a processor configured to receive instruction bytes and data bytes, wherein the processor is configured to operate on the data bytes according to instructions formed by the instruction bytes; and
   a cache configured to receive and store victimized instruction bytes and victimized data bytes from the processor, wherein the cache is configured to receive and store parity information and predecode information for the stored victimized instruction bytes, and wherein the cache is configured to receive and store error correction code (ECC) bits for the stored victimized data bytes.

7. The apparatus of claim 6, wherein the cache is configured to provide the victimized data bytes and the corresponding stored ECC bits to the processor in response to the processor requesting the victimized data bytes.

8. The apparatus of claim 6, wherein the cache is a level-two cache that is implemented on a common die with the processor.

9. The apparatus of claim 6, wherein the cache is a level-two cache that is implemented on a different die than the processor.

10. The apparatus of claim 6, wherein the processor further comprises parity generation and checking logic configured to:
    generate the parity bits for the instruction bytes transferred to the cache, and
    check the parity bits for the instruction bytes transferred from the cache.

11. The apparatus of claim 6, wherein the cache is configured to provide the victimized instruction bytes and the corresponding stored parity information and the corresponding stored predecode information to the processor in response to the processor requesting the victimized instruction bytes.

12. The apparatus of claim 11, wherein the processor is configured to use the conveyed predecode information in lieu of generating new predecode information.

13. The apparatus of claim 6, wherein the cache comprises cache lines, wherein each cache line is configured to store an indicator bit indicative of whether the logical block stores predecode bits for instruction bytes or error checking and correction bits for data bytes.

14. The apparatus of claim 13, wherein each cache line include a first storage area and a second storage area, wherein each cache line is configured to store an indicator bit indicative of whether: (a) instruction bytes are stored in the cache line's first storage area, and predecode bits and a parity bit are stored in the cache line's second area, or (b) data bytes are stored in the cache line's first storage area and ECC bits are stored in the cache line's second storage area.

15. The apparatus of claim 6, wherein the processor further comprises error checking and correction logic configured to:
    generate the ECC bits for the data bytes transferred to the cache, and
    check the ECC bits for the data bytes transferred from the cache.

16. The apparatus of claim 15, wherein the error checking and correction logic is configured to use the ECC bits to correct at least one bit errors in the data bytes transferred from the cache.

17. A method comprising:

receiving instruction bytes;

generating predecode information for the instruction bytes;

storing the instruction bytes and the predecode information in a first memory;

outputting at least a portion of the instruction bytes and the predecode information with parity information to a second memory in response to the instruction bytes being overwritten in the first memory;

receiving data bytes;

storing the data bytes to a third memory; and outputting at least a portion of the data bytes with corresponding error correction code information to the second memory in response to the data bytes being overwritten in the third memory.

18. The method of claim 17, wherein the second memory is divided into cache lines, wherein the method further comprises storing an indicator bit in each cache line in the second memory, wherein the indicator bit is indicative of whether the predecode bits or the error correction code bits are stored therein.

19. The method of claim 18, further comprising:

storing an indicator bit for each logical block in the second memory, wherein the indicator bit is indicative of whether predecode bits or error checking and correction bits are stored therein.

20. The method of claim 18, further comprising:

conveying the at least one stored parity bit and the corresponding stored portion of the instruction bytes and the predecode information back to the processor, wherein the processor is configured to use the conveyed predecode information in lieu of generating new predecode information if the parity bit is correct.

21. A computer system comprising:

a main system memory;

a memory controller coupled to the main system memory;

a microprocessor coupled to the memory controller, wherein the microprocessor is configured to receive instruction bytes and data bytes, wherein the processor is configured to operate on the data bytes according to instructions formed by the instruction bytes; and a cache configured to receive and store victimized instruction bytes and victimized data bytes from the processor, wherein the cache is configured to receive and store parity information and predecode information for the stored victimized instruction bytes, and wherein the level two cache is configured to receive and store error correction code bits for the stored victimized data bytes.

22. The computer system of claim 21, wherein the memory controller further comprises parity generation and checking logic configured to generate and check parity for bytes transferred to and from the main system memory.

23. The computer system of claim 21, wherein the memory controller further comprises error correction code generation and checking logic configured to generate and check error correction code bits for bytes transferred to and from the main system memory.

* * * * *